US012657876B2

(12) United States Patent　　(10) Patent No.:　US 12,657,876 B2
Iventosch et al.　　　　　　　　　　(45) Date of Patent:　Jun. 16, 2026

(54) AI-ASSISTED HUMAN DATA AUGMENTATION AND CONTINUOUS TRAINING FOR MACHINE LEARNING MODELS

(71) Applicant: Pensa Systems, Inc., Austin, TX (US)

(72) Inventors: Joel Iventosch, Austin, TX (US); Michael Pav, St. Petersburg, FL (US); Bora Yavuz, Istanbul (TR); Pinar Kaprali, Istanbul (TR); James E. Dutton, Spicewood, TX (US)

(73) Assignee: Pensa Systems, Inc., Austin, TX (US)

( * ) Notice: Subject to any disclaimer, the term of this patent is extended or adjusted under 35 U.S.C. 154(b) by 614 days.

(21) Appl. No.: 17/840,586

(22) Filed: Jun. 14, 2022

(65) Prior Publication Data

US 2022/0398829 A1　　Dec. 15, 2022

Related U.S. Application Data

(60) Provisional application No. 63/210,374, filed on Jun. 14, 2021.

(51) Int. Cl.
　　*G06V 10/764*　　　(2022.01)
　　*G06V 10/776*　　　(2022.01)
　　　　　　(Continued)

(52) U.S. Cl.
　　CPC .......... *G06V 10/765* (2022.01); *G06V 10/776* (2022.01); *G06V 10/7788* (2022.01); *G06V 10/82* (2022.01)

(58) Field of Classification Search
　　CPC ............... G06V 10/765; G06V 10/776; G06V 10/7788; G06V 10/82; G06V 10/774; G06V 10/7784
　　See application file for complete search history.

(56) References Cited

U.S. PATENT DOCUMENTS 8,620,078 B1 * 12/2013 Chapleau ............. G06V 30/153
　　　　　　　　　　　　　　　　　　382/173
8,706,655 B1 * 4/2014 Rangarajan ........ G06Q 30/0282
　　　　　　　　　　　　　　　　　　706/12

(Continued)

OTHER PUBLICATIONS

Chen, Wei-Yu, et al. "A Closer Look at Few-Shot Classification." ICLR, 2019, pp. 1-16.

(Continued)

*Primary Examiner* — Aaron W Carter
(74) *Attorney, Agent, or Firm* — John A. Fortkort; Fortkort & Houston PC

(57)　　　　　ABSTRACT

A method is provided for training at least one classifier model used by an artificial intelligence (AI) system to recognize each of a set of objects and to assign each of the set of objects to a class. The method includes training the at least one classifier model on a training dataset, thereby producing at least one trained classifier model; using the at least one trained classifier model to detect and classify each member of a set of objects, thereby generating a set of inferences, wherein each inference includes (a) a cropped image of a classified object, (b) the classified object's inferred class, and (c) a confidence score associated with the inferred classification; examining the set of inferences with a machine implemented audit trigger, wherein the audit trigger identifies a subset of the set of inferences whose members have (i) a confidence score that falls below a predetermined threshold value, or (ii) a missing classification; and if the identified subset has at least one member, subjecting the identified subset to a human audit, thereby yielding a corrected set of observations, wherein, for each member of the corrected set of observations, the inferred class of the corresponding member of the set of inferences is replaced with a corrected class. The corrected set of (Continued)

observations is then added to a training dataset and used to improve the future accuracy of the classifier model.

28 Claims, 3 Drawing Sheets

(51) Int. Cl.
G06V 10/778 (2022.01)
G06V 10/82 (2022.01)

(56) References Cited

U.S. PATENT DOCUMENTS

| | | | | |
|---|---|---|---|---|
| 10,885,395 | B2 | 1/2021 | Iventosch et al. | |
| 11,314,992 | B2 | 4/2022 | Iventosch et al. | |
| 11,556,746 | B1 * | 1/2023 | Dasgupta | G06N 5/04 |
| 11,636,602 | B1 * | 4/2023 | Havir | G06V 10/774 |
| | | | | 382/164 |
| 2003/0147558 | A1 * | 8/2003 | Loui | G06F 18/254 |
| | | | | 382/228 |
| 2011/0170769 | A1 * | 7/2011 | Sakimura | G06F 18/40 |
| | | | | 382/159 |
| 2014/0040173 | A1 * | 2/2014 | Sagher | G06V 30/194 |
| | | | | 706/12 |
| 2014/0198979 | A1 * | 7/2014 | Hamarneh | G06T 7/174 |
| | | | | 382/154 |
| 2017/0255891 | A1 * | 9/2017 | Morate | G06V 20/52 |
| 2019/0080207 | A1 * | 3/2019 | Chang | G06F 16/7837 |
| 2019/0385106 | A1 | 12/2019 | Iventosch et al. | |
| 2020/0202257 | A1 * | 6/2020 | Lee | G06V 10/82 |
| 2020/0382527 | A1 * | 12/2020 | Mitelman | G06N 20/20 |
| 2022/0044298 | A1 | 2/2022 | Oshinaike et al. | |
| 2022/0398829 | A1 * | 12/2022 | Iventosch | G06V 10/774 |
| 2022/0405605 | A1 * | 12/2022 | Yokoyama | G06T 7/00 |
| 2022/0415029 | A1 * | 12/2022 | Iventosch | G06V 10/26 |
| 2023/0222779 | A1 * | 7/2023 | Hilton | G06V 10/7788 |
| | | | | 382/156 |
| 2024/0177446 | A1 * | 5/2024 | Kudo | G06V 10/82 |
| 2024/0355580 | A1 * | 10/2024 | Yim | G06T 7/12 |
| 2024/0362936 | A1 * | 10/2024 | Shen | G06T 7/11 |

OTHER PUBLICATIONS

Xu, Jiaming, et al. "Convolutional Neural Networks for Text Hashing." Proceedings of the 24th International Joint Conference on Artificial Intelligence, 2015, pp. 1369-1375.

Lai, Hanjiang, et al. "Simultaneous Feature Learning and Hash Coding with Deep Neural Networks." 2015 IEEE Conference on Computer Vision and Pattern Recognition (CVPR), Apr. 14, 2015, pp. 3270-3278., doi: 10.1109/cvpr.2015.7298947.

Cao, Yue, et al. "Correlation Hashing Network for Efficient Cross-Modal Retrieval." Procedings of the British Machine Vision Conference 2017, Feb. 20, 2017, doi:10.5244/c.31.128.

Xian, Yongqin, et al. "Zero-Shot Learning—A Comprehensive Evaluation of the Good, the Bad and the Ugly." IEEE Transactions on Pattern Analysis and Machine Intelligence, vol. 41, No. 9, Jan. 2019, pp. 2251-2265., doi:10.1109/tpami.2018.2857768.

Wang, Xiaolong, et al. "Zero-Shot Recognition via Semantic Embeddings and Knowledge Graphs." 2018 IEEE/CVF Conference on Computer Vision and Pattern Recognition, Apr. 8, 2018, doi:10.1109/cvpr.2018.00717.

Zhu, Pengkai, et al. "Generalized Zero-Shot Recognition Based on Visually Semantic Embedding." 2019 IEEE/CVF Conference on Computer Vision and Pattern Recognition (CVPR), Apr. 9, 2019, doi:10.1109/cvpr.2019.00311.

Atzmon, Yuval, and Gal Chechik. "Adaptive Confidence Smoothing for Generalized Zero-Shot Learning." 2019 IEEE/CVF Conference on Computer Vision and Pattern Recognition (CVPR), May 13, 2019, doi:10.1109/cvpr.2019.01194.

Zhao, An, et al. "Domain-Invariant Projection Learning for Zero-Shot Recognition." Proceedings of the 32nd Conference on Neural Information Processing Systems (NeurIPS), 2018.

Liu, Shichen, et al. "Generalized Zero-Shot Learning with Deep Calibration Network." Proceedings of the 32nd Conference on Neural Information Processing Systems (NeurIPS), 2018.

Yu, Yunlong, et al. "Stacked Semantics-Guided Attention Model for Fine-Grained Zero-Shot Learning." Proceedings of the 32nd Conference on Neural Information Processing Systems (NeurIPS), 2018.

Guo, Yuchen, et al. "Zero-Shot Recognition via Direct Classifier Learning with Transferred Samples and Pseudo Labels." Proceedings of the Thirty-First AAAI Conference on Artificial Intelligence (AAAI-17), 2017.

Wang, Wenlin, et al. "Zero-Shot Learning via Class-Conditioned Deep Generative Models." Proceedings of the Thirty-Second AAAI Conference on Artificial Intelligence (AAAI-18), 2018.

Cao, Yue et al. "Collective Deep Quantization for Efficient Cross-Modal Retrieval." Proceedings of the Thirty-First AAAI Conference on Artificial Intelligence (AAAI-17), 2017.

Jiang, Qing-Yuan, and Wu-Jun Li. "Deep Cross-Modal Hashing." 2017 IEEE Conference on Computer Vision and Pattern Recognition (CVPR), 2017, doi:10.1109/cvpr.2017.348.

Chen, Binghui, and Weihong Deng. "Hybrid-Attention Based Decoupled Metric Learning for Zero-Shot Image Retrieval." 2019 IEEE/CVF Conference on Computer Vision and Pattern Recognition (CVPR), 2019, doi:10.1109/cvpr.2019.00286.

Lin, Kevin, et al. "Deep Learning of Binary Hash Codes for Fast Image Retrieval." 2015 IEEE Conference on Computer Vision and Pattern Recognition Workshops (CVPRW), 2015, doi:10.1109/cvprw.2015.7301269.

Cao, Yue, et al. "Deep Cauchy Hashing for Hamming Space Retrieval." 2018 IEEE/CVF Conference on Computer Vision and Pattern Recognition, 2018, doi:10.1109/cvpr.2018.00134.

Zhu, Han et al. "Deep Hashing Network for Efficient Similarity Retrieval." Proceedings of the Thirtieth AAAI Conference on Artificial Intelligence (AAAI-16), 2016.

Cao, Yue et al. "Deep Quantization Network for Efficient Image Retrieval." Proceedings of the Thirtieth AAAI Conference on Artificial Intelligence (AAAI-16), 2016.

Cao, Yue, et al. "Deep Visual-Semantic Quantization for Efficient Image Retrieval." 2017 IEEE Conference on Computer Vision and Pattern Recognition (CVPR), 2017, doi:10.1109/cvpr.2017.104.

Cao, Zhangjie, et al. "HashNet: Deep Learning to Hash by Continuation." 2017 IEEE International Conference on Computer Vision (ICCV), 2017, doi:10.1109/iccv.2017.598.

Jiang, Huajie, et al. "Learning Class Prototypes via Structure Alignment for Zero-Shot Recognition." Computer Vision—ECCV 2018 Lecture Notes in Computer Science, 2018, pp. 121-138., doi:10.1007/978-3-030-01249-6_8.

Li, Wu-Jun, Sheng Wang, and Wang-Cheng Kang. "Feature learning based deep supervised hashing with pairwise labels." 2015, doi:arXiv:1511.03855.

Song, Jie, et al. "Selective Zero-Shot Classification with Augmented Attributes." Computer Vision—ECCV 2018 Lecture Notes in Computer Science, 2018, pp. 474-490., doi:10.1007/978-3-030-01240-3_29.

Lee, Chung-Wei, et al. "Multi-Label Zero-Shot Learning with Structured Knowledge Graphs." 2018 IEEE/CVF Conference on Computer Vision and Pattern Recognition, 2018, doi:10.1109/cvpr.2018.00170.

Niu, Li, et al. "Webly Supervised Learning Meets Zero-Shot Learning: A Hybrid Approach for Fine-Grained Classification." 2018 IEEE/CVF Conference on Computer Vision and Pattern Recognition, 2018, doi:10.1109/cvpr.2018.00749.

"One-Shot Learning." Wikipedia, Wikimedia Foundation, Mar. 27, 2020, en.wikipedia.org/wiki/One-shot_learning.

Felix, Rafael, et al. "Multi-Modal Cycle-Consistent Generalized Zero-Shot Learning." Computer Vision—ECCV 2018 Lecture Notes in Computer Science, 2018, pp. 21-37., doi:10.1007/978-3-030-01231-1_2.

Cao, Yue, et al. "Deep Visual-Semantic Hashing for Cross-Modal Retrieval." Proceedings of the 22nd ACM SIGKDD International Conference on Knowledge Discovery and Data Mining—KDD 16, 2016, doi:10.1145/2939672.2939812.

(56)     References Cited

OTHER PUBLICATIONS

Verma, Vinay Kumar, et al. "Generalized Zero-Shot Learning via Synthesized Examples." 2018 IEEE/CVF Conference on Computer Vision and Pattern Recognition, 2018, doi:10.1109/cvpr.2018. 00450.

Sinha, Smita. "What is Zero-Shot Learning?" Analytics India Magazine, Jun. 18, 2018, analyticsindiamag.com/what-is-zero-shot-learning/.

Xian, Yongqin, et al. "Feature Generating Networks for Zero-Shot Learning." 2018 IEEE/CVF Conference on Computer Vision and Pattern Recognition, 2018, doi:10.1109/cvpr.2018.00581.

Zhao, Fang, et al. "Deep Semantic Ranking Based Hashing for Multi-Label Image Retrieval." 2015 IEEE Conference on Computer Vision and Pattern Recognition (CVPR), 2015, doi:10.1109/cvpr. 2015.7298763.

Grover D, Bauhoff S, Friedman J (2019) Using supervised learning to select audit targets in performance-based financing in health: An example from Zambia. PLoS One 14(1): e0211262. https://doi.org/10.1371/journal.pone.0211262.

Rich, Michael D.; Mills, Robert F.; Dube, Thomas E.; and Rogers, Steven K. (2016) "Evaluating Machine Learning Classifiers for Defensive Cyber Operations," Military Cyber Affairs: vol. 2 : Iss. 1 , Article 6. https://www.doi.org/http://doi.org/10.5038/2378-0789.2.1.1005.

Nishtha Hooda, Seema Bawa & Prashant Singh Rana (2020) Optimizing Fraudulent Firm Prediction Using Ensemble Machine Learning: A Case Study of an External Audit, Applied Artificial Intelligence, 34:1, 20-30, DOI: 10.1080/08839514.2019.1680182.

Eid, FE., Elmarakeby, H.A., Chan, Y.A. et al. Systematic auditing is essential to debiasing machine learning in biology. Commun Biol 4, 183 (2021). https://doi.org/10.1038/s42003-021-01674-5.

Hooda, N., Bawa, S., & Rana, P.S. (2018). Fraudulent Firm Classification: A Case Study of an External Audit. Applied Artificial Intelligence, 32, 48-64.

Barredo-Arrieta, A., & Del Ser, J. (2020). Plausible Counterfactuals: Auditing Deep Learning Classifiers with Realistic Adversarial Examples. 2020 International Joint Conference on Neural Networks (IJCNN), 1-7.

San Diego Now Intelligence, published by ServiceNow (Jun. 2, 2022).

* cited by examiner

AI-ASSISTED HUMAN DATA AUGMENTATION AND CONTINUOUS TRAINING FOR MACHINE LEARNING MODELS

CROSS-REFERENCE TO RELATED APPLICATION

This application claims the benefit of priority from U.S. Provisional Patent Application No. 63/210,374, which was filed on Jun. 14, 2021, which has the same title and inventors, and which is incorporated herein by reference in its entirety.

FIELD OF THE DISCLOSURE

The present application relates generally to object recognition from images, and more specifically to recognition of Consumer-Packaged Goods (CPGs).

BACKGROUND OF THE DISCLOSURE

Establishments that buy and sell merchandise that consumers use up and replace on a frequent basis, known in the industry as Consumer-Packaged Goods or CPGs, are an important part of the economy. Traditional brick and mortar grocery and retail stores are being supplemented by online or "omnichannel" outlets that allow for low-touch shopping options. The popularity of these options exploded at the onset of the global Covid-19 pandemic in early 2020. Typically, these establishments employ sophisticated automation to track what comes in (supply chain management systems) and goes out (point of sale systems) but have little visibility into what happens to the products in between. However, visibility into on-the-shelf product availability is vitally important, both for in-person and online shoppers.

Recent advances in artificial intelligence, notably the use of artificial neural networks to recognize objects from camera images, make it possible to survey and count inventory and track its movement in a completely automated and objective way. The advent of deep convolutional neural networks (CNNs) as a mechanism for recognizing individual objects within an image or image stream (video) has revolutionized the field [A. Krizhevsky, I. Sutskever, and G. E. Hinton. Imagenet classification with deep convolutional neural networks. In Advances in neural information processing systems, pages 1097-1105, 2012].

Automated in-store inventory solutions based on deep learning techniques, however, require training and continuous refinement of their trained datasets as product packaging changes, new products are added, and brands are bought and sold by multi-national CPG companies. Moreover, a single large grocery store might display as many as 100,000 distinct products, some of which appear to be quite similar in appearance (to both humans and AI). Overall, there are millions of types of CPGs throughout the world. To be able to report accurately on the number and status of all of those products, it is often necessary to employ some degree of human review or audit of the machine-generated inferences before results are published to data analytics systems for further insights. Most companies that offer machine-driven shelf inventory products employ at least some degree of human review and augmentation.

The sheer volume of inferences a machine learning solution is capable of delivering to human reviewers makes it impractical to review every single automated decision. Instead, some sort of statistical audit technique is typically used (often relying on random sampling) to reduce the workload on the human data teams.

Human data teams are also very involved in the initial and continuous training of AI-based classification systems. An entire industry has grown up that employs relatively low-skilled workers to label pictures of various objects, including CPGs, to produce training datasets for artificial neural networks.

SUMMARY OF THE DISCLOSURE

Figure 1:
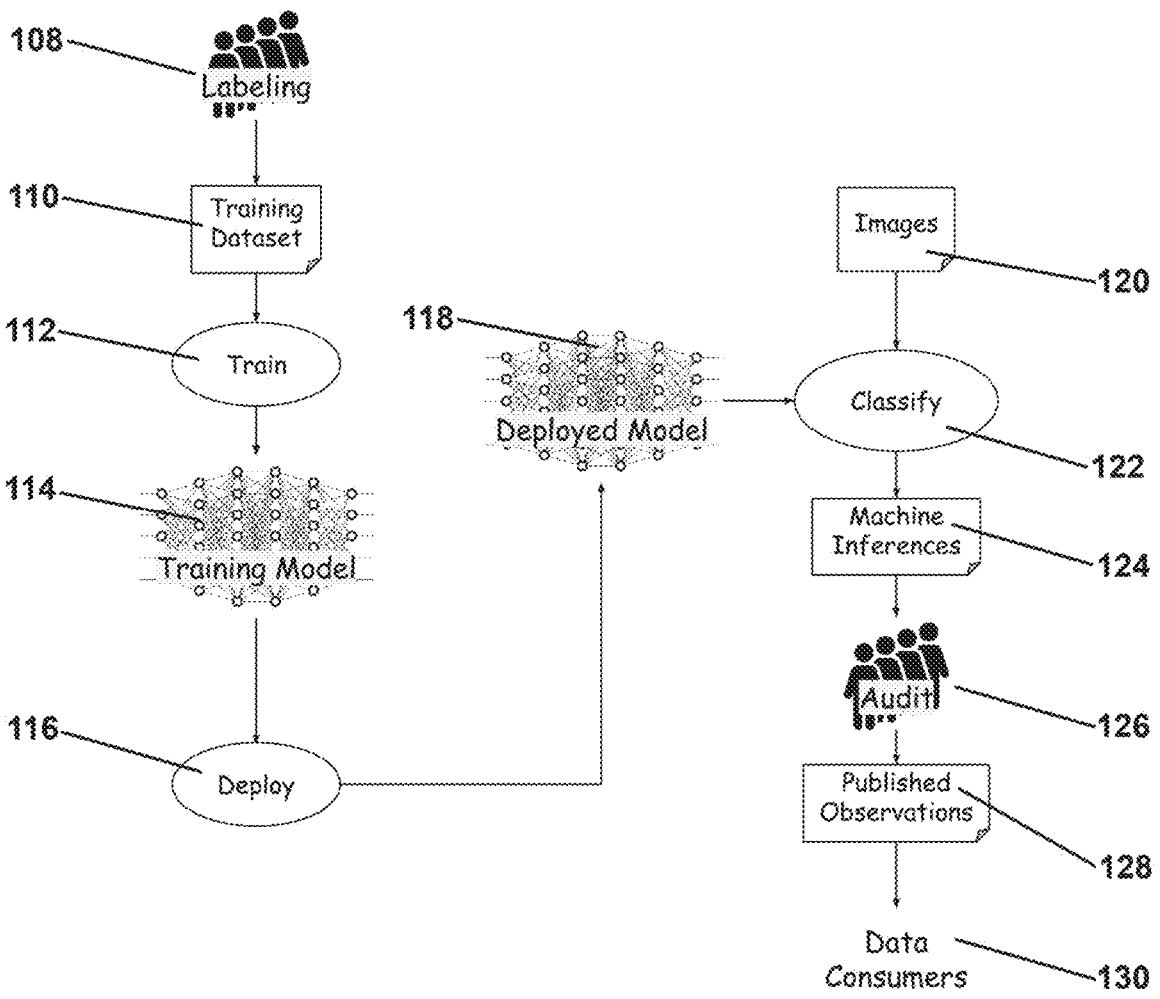
FIG. 1 is a flow diagram depicting a conventional deep learning data process.

In one aspect, a method is provided for training at least one classifier model used by an artificial intelligence (AI) system to recognize each of a set of objects and to assign each of the set of objects to a class. The method comprises training the at least one classifier model on a training dataset, thereby producing at least one trained classifier model; using the at least one trained classifier model to detect and classify each member of a set of objects, thereby generating a set of inferences, wherein each inference includes (a) a cropped image of a classified object, (b) the classified object's inferred class, and (c) a confidence score associated with the inferred classification; examining the set of inferences with a machine implemented audit trigger, wherein the audit trigger identifies a subset of the set of inferences whose members have (i) a confidence score that falls below a predetermined threshold value, or (ii) a missing classification; and if the identified subset has at least one member, subjecting the identified subset to a human audit, thereby yielding a corrected set of observations, wherein, for each member of the corrected set of observations, the inferred class of the corresponding member of the set of inferences is replaced with a corrected class.

In another aspect, a tangible, non-transient medium is provided. The medium contains suitable programming instructions which, when processed by at least one computer processor, perform the foregoing method.

In a further aspect, a system is provided for recognizing objects and assigning them to a class. The system comprises (a) a classifier model; (b) an artificial intelligence (AI) system which uses the classifier model to recognize each of a set of objects and to assign each of the set of objects to a class; (c) a trainer which utilizes a training dataset to train the at least one classifier model; (d) an inference engine which uses the at least one trained classifier model to detect and classify each member of a set of objects, thereby generating a set of cropped images of classified objects and a set of inferences, wherein each member of the set of inferences includes (i) an inferred classification for a classified object, and (ii) a confidence score associated with the inferred classification; (e) an examination engine which examines the set of inferences with a machine implemented audit trigger, thereby generating an identified subset of the set of inferences containing any members of the set of inferences which are flagged by the audit trigger, wherein the audit trigger flags a member of the set of inferences if it has (i) a confidence score that falls below a predetermined threshold value, or (ii) a missing classification; and (f) an audit engine which, if the identified subset has at least one member, (i) outputs a report identifying the members of the identified subset, (ii) receives as input a corrected set of observations, and (iii) replaces, in the set of inferences, each member of the identified subset with a member of the corrected set of observations.

DETAILED DESCRIPTION

There is presently a need in the art to simultaneously reduce the workload on human data audit teams while increasing the accuracy of the overall human-machine interaction in predicting CPG classes. There is further a need in the art to be able to utilize the results of the human audits to re-train the deep learning models, thus further reducing audit loads in the future. In very general terms, there is a need in the art to be able to essentially ask the AI where it needs help and have it use feedback from human auditors to learn to perform better in the future. These and other needs may be met by the systems and methodologies disclosed herein.

In a preferred embodiment, systems and methodologies are disclosed herein which implement a computer-assisted method of selecting audit tasks for human review. The results of the audit tasks may then be utilized to perform various tasks, such as (a) assessing and improving the accuracy of the overall classification system, (b) re-training the automated classifier so that it continuously improves its accuracy, and (c) tuning the audit selection process so that it improves its future audit recommendations.

The systems and methodologies disclosed herein may be utilized to optimize the contribution of humans-in-the-loop and reduce their workload over time, thus allowing them to focus more attention onboarding new products to expand the product offering. These systems and methodologies may also be utilized to optimize the initial ingest of new products because they require significantly fewer training images (perhaps as few as one) to "bootstrap" a product in the system. If the new product is sufficiently similar to existing products the system already knows how to identify, nothing more is required. If, on the other hand, the initial recognition accuracy of the new product is insufficient, the directed audit and feedback loop described herein will autonomously improve accuracy.

The efficacy of the preferred embodiments of the systems and methodologies disclosed herein does not depend heavily on the exact architecture of the underlying classification system. It is assumed that this architecture features some sort of deep-learning design that consumes digital images and produces inferences for each of the items found in the image. Each such inference consists, generally, of a class identifier (e.g., a Universal Product Code or GTIN) together with a confidence score. The underlying classifier is then augmented by adding two additional components: (1) an audit trigger that chooses which inferences to submit to the human auditors, and (2) a benefit scoring mechanism that chooses which incorrect inferences (as judged by a human auditor) are most likely to improve future accuracy and, therefore, should be included in the next incremental training set(s).

Reference is now made to the drawings, in which like reference designators refer to like elements. FIG. 1 depicts (for contrast with the preferred embodiments of the systems and methodologies disclosed herein) a conventional method implementing a train-deploy-audit-publish data flow for machine learning applications. In the methodology disclosed therein, human labelers 108 produce a training dataset 110 which is provided to the system and used to train 112 the next version of a classifier 114 deep learning model. The timing and frequency of training and retraining is determined solely by the human caretakers of the model. After training, humans make the determination of whether and when to deploy 116 the newly trained model into production 118, thus transitioning from the training regime to the run-time regime. The deployed model 118 consumes images 120 and produces a set of machine inferences 124. Each inference 124 consists of three elements: (1) a cropped image of the classified object, (2) the object's inferred class, and (3) a confidence score. The machine inferences 124 are then sampled and a small percentage of them are submitted for human audit 126. The un-audited inferences are combined with any audit corrections to form a set of published observations 128 which are the ultimate result of the human-AI classifier system and are published to data consumers 130 for further analysis and computation of KPIs, for example. Note this conventional flow is entirely driven by human decision-making. Human operators decide when to produce a new dataset, when to retrain the model to take into account new information, and which and how many machine inferences to audit prior to publication.

Figure 2:
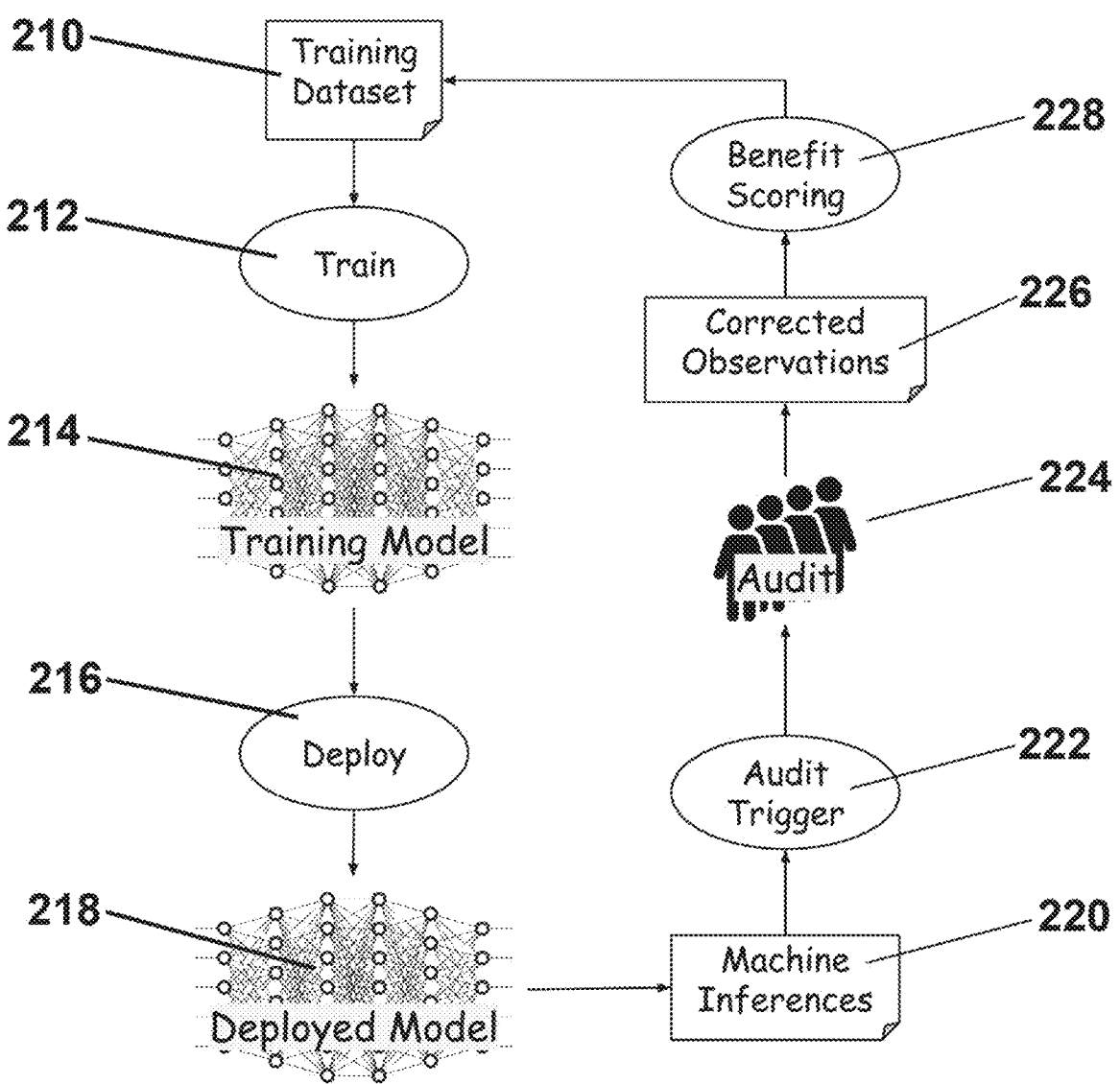
FIG. 2 is a flow diagram depicting a continuous training/continuous deployment process of the type depicted herein.

FIG. 2 illustrates a particular, nonlimiting embodiment of a method which features a closed-loop, machine-assisted data flow in accordance with the teachings herein. As with the method of FIG. 1, an initial training dataset 210 is used to train 212 the classifier model(s) 214. Once the training dataset 210 is complete, it is automatically submitted to the training process 212. After the model is trained or retrained, it is automatically deployed 216 into production. Moving now into the run-time regime, the deployed model 218 is used to detect and classify objects in production images to produce machine inferences 220 as above. These inferences are then examined by an automated process called the audit trigger 222 that will determine which inferences to submit to human auditors 224. Generally speaking, the machine will determine which of its own inferences it trusts the least and ask for human help by assigning observation audit tasks to members of a data team. The human auditors 224 may decide to correct some of the machine inferences if they determine they are incorrect, resulting in a set of corrected observations 226. These corrected observations are examined by a benefit scoring 228 process to determine which of the corrected observations are used to retrain the machine learning model(s). These corrected observations are then written into the training dataset 210 utilized in a further iteration of the method, and the cycle begins again.

Figure 3:
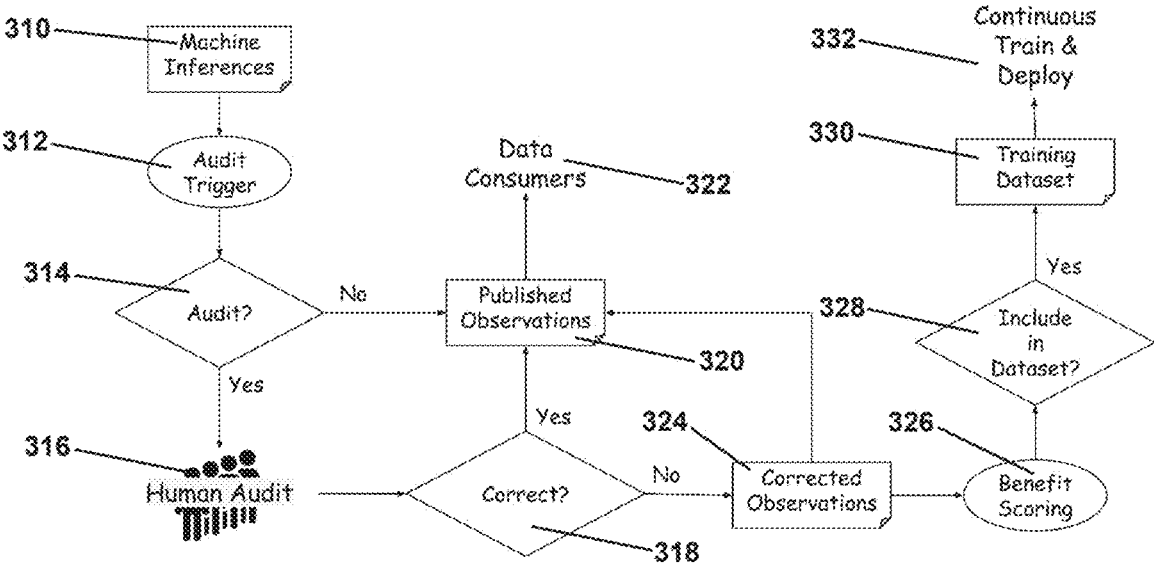
FIG. 3 is a flow diagram depicting a process of the type depicted herein equipped with machine-assisted audits.

FIG. 3 is a flowchart providing a more detailed data flow diagram disclosing how the machine-assisted audit process works in a preferred embodiment of the systems and methodologies disclosed herein. Individual machine inferences 310 produced by the classifier model(s) are first examined by an audit trigger 312 to determine whether they need to be reviewed by a human auditor. In some embodiments of the present invention, audits would be triggered if, for example, the model is completely unable to classify an object image or if its confidence in doing so is below a minimum threshold. More embodiments for this process are described below. The audit trigger 312 makes a binary decision 314 whether the inference requires further verification. If the audit trigger 312 is confident enough in a machine inference that it does not require human review, the inference is written directly to the set of published observations 320. If, on the other hand, the audit trigger 312 determines to submit the inference for review, it assigns an observation audit task to one or more human auditors 316. For each observation audit, the human auditor 316 will examine the machine inference (cropped image, class, and confidence) and make a binary determination 318 whether it is correct or not. Correct inferences immediately become published observations 320, while incorrect inferences are corrected before being added to the published observations 320. All published observations are finally made available to data consumers 322. In addition to their publication, corrected observations 324 are also submitted to a benefit scoring process 326 that determines whether or not to include each human-corrected observation in a future training dataset. Unsuitable observations (e.g., ones with blurry or occluded images or images the benefit scoring process has deemed will not help improve future classification models) will be discarded while others 328 will be written to a training dataset 330 for use in the next continuous training/deployment cycle 332.

In some embodiments of the systems and methodologies described herein, the underlying classifier model is a set of cooperating models used to identify and qualify different aspects of the images to be classified. For example, and for illustration purposes only, a sequence of models can be used that first detect and crop object images within larger frames or videos, then find similarities to existing classes, then differentiate between the objects to be classified and other similar classes of objects. Among embodiments with multiple cooperating classifier models, some will include multiple benefit scoring procedures to help construct training datasets for the models based on different criteria.

In some embodiments of the systems and methodologies described herein, the audit trigger process is an algorithmic or rules-based implementation that determines whether a human review is required by examining certain properties of the machine inferences. For example, and for illustrative purposes only, inferences may be chosen for human audit for reasons such as: (a) the classifier model assigns the object to the Unknown class, indicating it simply does not know what it is; (b) the inference confidence score is below a minimum threshold; (c) the difference between the confidence scores of the top two inferences for the same object is below a minimum threshold; (d) the class assigned in the machine inference has an overall accuracy that is below a minimum threshold; (e) the inference's proposed class is one of a set of commonly confused classes due to very fine-grained differences in packaging.

In some embodiments of the systems and methodologies described herein, the audit trigger is a deep learning model that simultaneously minimizes the number of audit tasks to be performed and maximizes the overall accuracy of the human-computer classification system. For example, and for illustrative purposes only, a deep-learning approach for the audit trigger might train itself in an unsupervised or weakly-supervised way to adjust its selection criteria based on the results in prior cycles. If prior cycles produce a large proportion of human audits for which the machine inferences were actually correct, it might learn to reduce the number of audit tasks assigned for future cycles, thus reducing the human workload and associated costs without reducing overall accuracy.

In some embodiments of the systems and methodologies described herein, a supplemental comprehensive human QA review of audited inferences may be performed before releasing published observations and/or retraining the models based on the generated dataset. This would allow utilization of less highly trained data team members for the individual audit tasks.

In some embodiments of the systems and methodologies described herein, the benefit scoring procedure that determines whether corrected observations should be included in the next training dataset may take any of various forms. For example, and for illustrative purposes only, any of the following approaches can be used: (a) a deep learning model that learns over time which observations to include in future trainings; (b) an algorithmic process that examines characteristics such as image quality or class accuracy; (c) a human-augmentation model that allows data team members to decide or participate in the decision.

In some embodiments of the systems and methodologies described herein, the benefit scoring procedure chooses which corrected observations to include in the training dataset based on a number of different factors. For example, and for illustrative purposes only, any of the following image characteristics may be used to make this determination: (a) Is the image associated with the corrected observation of sufficiently high quality to provide good training guidance to the model? (b) Is there already a sufficient number of training images for the product identified in the corrected observation?

In some embodiments of the systems and methodologies described herein, the initial training dataset contains just a few labelled images of each new product or a single labeled image, or it might even be completely empty. In these embodiments, the initial data labelling activity may be partially or completely replaced by the continuous training and deployment aspect of the system disclosed herein. For example, if a brand-new product or package appears that the system has not been trained to recognize, its images will trigger observation audits that will, in effect, ask the human auditors to provide guidance as to its intended classification. Guidance from the human auditors will produce a new training dataset and the system will, over time, learn to recognize the new product or packaging.

In some embodiments of the systems and methodologies described herein, the proportion of corrected inferences resulting from the human audit process is used to compute recognition accuracy metrics. Such metrics can be used to monitor performance of the classifier models and to help inform and train the AI-assisted components of the system. In these embodiments, accuracy metrics at several different levels are computed including, but not limited to, product categories, geographic areas, and overall summary metrics.

Some embodiments of the systems and methodologies described herein may be implemented partially or wholly by software solutions. In such embodiments, the software will typically be in the form of suitable programming instructions recorded in a tangible, non-transient medium such as, for example, a disk, hard drive, solid state drive, or other suitable medium. When processed by at least one computer processor, these programming instructions will then implement the system or methodology or a portion thereof.

For example, in some embodiments, a software construct denoted an inference engine may operate to use trained classifier models to detect and classify each member of a set of objects, thereby generating a set of cropped images of classified objects and a set of inferences. Similarly, in some embodiments, a software construct denoted an examination engine may examine the set of inferences with a machine implemented audit trigger, thereby generating an identified subset of the set of inferences containing any members of the set of inferences which are flagged by the audit trigger. In still other embodiments, a software construct denoted an audit engine may operate, in the event the identified subset has at least one member, to (a) output a report identifying the members of the identified subset, (b) receive (e.g., from human auditors) as input a corrected set of inferences, and (c) replace, in the set of inferences, each member of the identified subset with a member of the corrected set of inferences.

The above description of the present invention is illustrative, and is not intended to be limiting. It will thus be appreciated that various additions, substitutions and modifications may be made to the above-described embodiments without departing from the scope of the present invention. Accordingly, the scope of the present invention should be construed in reference to the appended claims. It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out.

What is claimed is:

1. A method for training at least one classifier model used by an artificial intelligence (AI) system to recognize each of a set of objects and to assign each of the set of objects to a class, the method comprising:

training the at least one classifier model on a training dataset, thereby producing at least one trained classifier model;

using the at least one trained classifier model to detect and classify each member of a set of objects, thereby generating a set of inferences, wherein each inference includes (a) a cropped image of a classified object, (b) the classified object's inferred classification, and (c) a confidence score associated with the inferred classification;

examining the set of inferences with a machine implemented audit trigger, wherein the audit trigger identifies a subset of the set of inferences whose members have (i) a confidence score that falls below a predetermined threshold value, or (ii) a missing inferred classification;

if the identified subset has at least one member, subjecting the identified subset to a human audit, thereby yielding a corrected set of observations, wherein, for each member of the corrected set of observations, the inferred classification of the corresponding member of the set of inferences is replaced with a corrected classification;

examining the corrected set of observations with a benefit scoring process, thereby identifying at least one proposed modification to the training dataset; and incorporating the at least one proposed modification into the training dataset in a subsequent iteration of the method.

2. The method of claim 1, wherein each member of the set of objects is a consumer packaged good (CPG).

3. The method of claim 1, wherein the benefit scoring process excludes from the at least one proposed modification observations associated with an image that is blurry or occluded.

4. The method of claim 1, wherein the benefit scoring process implements a deep learning model that learns over time which observations to include in the training dataset utilized in a subsequent iteration of the method.

5. The method of claim 1, wherein the benefit scoring process implements an algorithmic process that examines characteristics selected from the group consisting of image quality and class accuracy.

6. The method of claim 1, wherein the benefit scoring process implements a human augmentation model that includes human participation in the decision.

7. The method of claim 1, wherein the benefit scoring process selects corrected observations for inclusion in the training dataset utilized in a subsequent iteration of the method using at least one selection criteria selected from the group consisting of (a) image quality, and (b) the number of training images already in the training dataset which correspond to the product identified in the corrected observation.

8. The method of claim 1, wherein the audit trigger identifies all members of the set of inferences for which the confidence score falls below a predetermined threshold value.

9. The method of claim 1, wherein the audit trigger identifies all members of the set of inferences which are missing a classification.

10. The method of claim 1, wherein the audit trigger identifies all members of the set of inferences for which the classifier model cannot identify the class to which the object belongs.

11. The method of claim 1, wherein the audit trigger identifies all members of the set of inferences for which the difference between the confidence scores of the top two inferences for the same object is below a predetermined threshold value.

12. The method of claim 1, wherein the audit trigger identifies all members of the set of inferences whose members have a confidence score that falls below a predetermined threshold value.

13. The method of claim 1, wherein the subset of the set of inferences is one of a set of commonly confused classes due to fine-grained differences in packaging.

14. The method of claim 1, further comprising:

publishing a set of observations to a group of data consumers, wherein the published set of observations includes (a) members of the set of inferences exclusive of the subset of the set of inferences, and (b) the corrected set of observations.

15. The method of claim 1, wherein the at least one classifier model is a set of cooperating models which identify and qualify distinct aspects of images to be classified.

16. The method of claim 15, wherein the at least one classifier model is a sequence of models that perform the steps of:

detecting and cropping object images within larger frames or videos;

identifying similarities of the detected object images to existing classes; and differentiating between the detected object images and other similar classes of objects.

17. The method of claim 16, wherein examining the corrected set of observations with a benefit scoring process includes examining the corrected set of observations with a plurality of benefit scoring processes.

18. The method of claim 17, wherein incorporating the at least one proposed modification into the training dataset in a subsequent iteration of the method results in the generation of a plurality of training datasets, and wherein each of the plurality of training datasets is used to train the classifier model based on a distinct set of criteria.

19. The method of claim 1, wherein the audit trigger is an algorithmic process.

20. The method of claim 1, wherein the audit trigger is a rules-based process.

21. The method of claim 1, wherein the audit trigger implements a deep-learning approach to adjust its selection criteria based on results achieved in prior iterations of the method.

22. The method of claim 21 wherein, if at least one of said prior iterations of the method produces a subset containing at least k members for which the inference was correct, and if k>m>0, wherein k and m are integers and m is a predetermined threshold value, then the audit trigger increases the predetermined threshold value for confidence scores in at least one subsequent iteration of the method.

23. The method of claim 1, further comprising:
using a proportion of corrected inferences resulting from the human audit process to compute recognition accuracy metrics.

24. The method of claim 23, further comprising:
using the computed recognition accuracy metrics to monitor the performance of the at least one classifier model.

25. The method of claim 23, further comprising:
using the computed recognition accuracy metrics to train at least one component of the AI system.

26. The method of claim 25, wherein the computed accuracy metrics include metrics selected from the group consisting of product categories, geographic areas, and overall summary metrics.

27. A tangible, non-transient medium containing suitable programming instructions which, when processed by at least one computer processor, perform the method of claim 1.

28. A method for training at least one classifier model used by an artificial intelligence (AI) system to recognize each of a set of objects and to assign each of the set of objects to a class, the method comprising:
training the at least one classifier model on a training dataset, thereby producing at least one trained classifier model;
using the at least one trained classifier model to detect and classify each member of a set of objects, thereby generating a set of inferences, wherein each inference includes
(a) a cropped image of a classified object,
(b) the classified object's inferred classification, and
(c) a confidence score associated with the inferred classification;
examining the set of inferences with a machine implemented audit trigger, wherein the audit trigger identifies a subset of the set of inferences whose members have (i) a confidence score that falls below a predetermined threshold value, or (ii) a missing inferred classification; and
if the identified subset has at least one member, subjecting the identified subset to a human audit, thereby yielding a corrected set of observations, wherein, for each member of the corrected set of observations, the inferred classification of the corresponding member of the set of inferences is replaced with a corrected classification;
wherein the audit trigger identifies all members of the set of inferences for which the difference between the confidence scores of the top two inferences for the same object is below a predetermined threshold value.

* * * * *